United States Patent Office 3,057,253
Patented Oct. 9, 1962

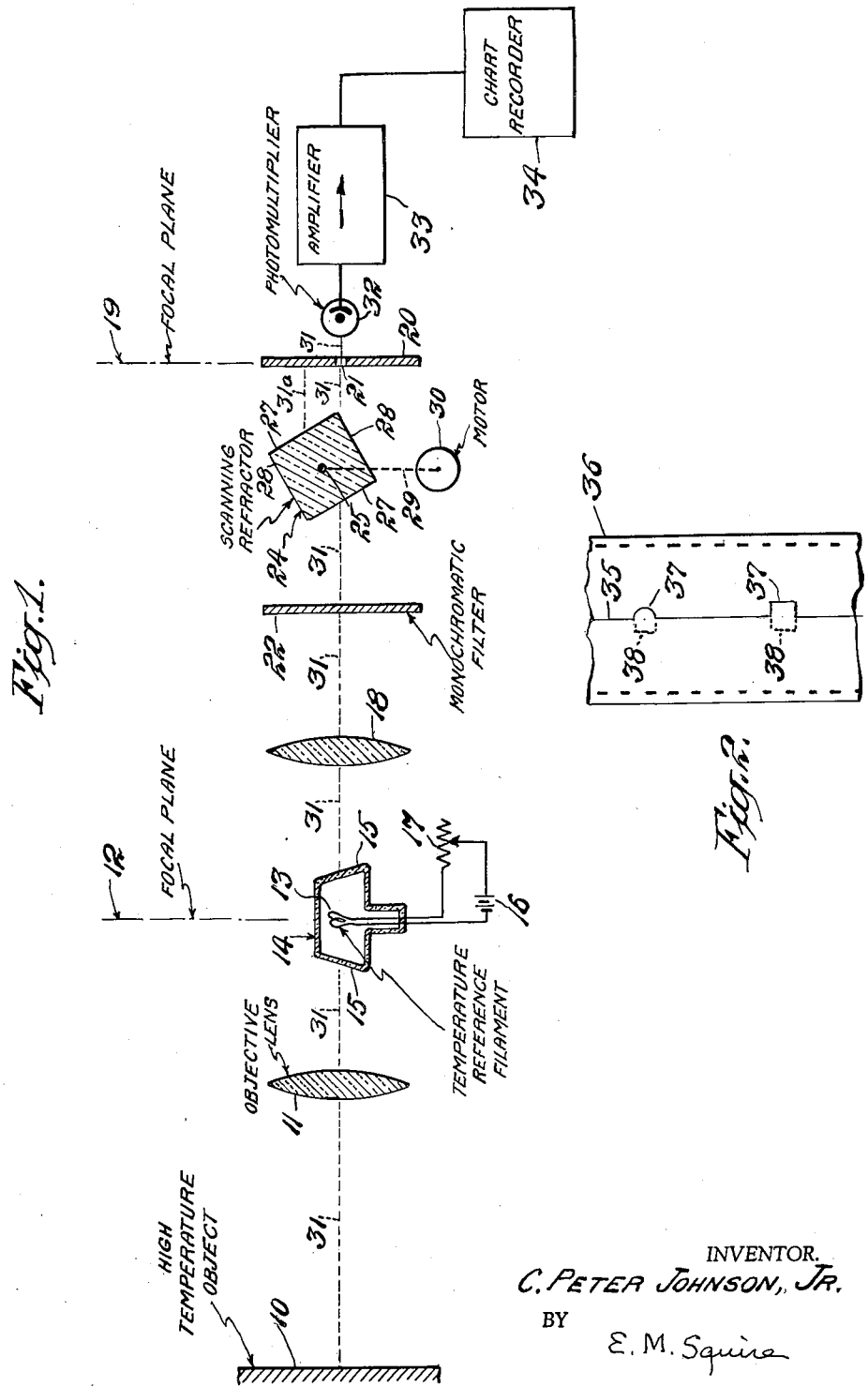

3,057,253
OPTICAL PYROMETER WITH PHOTOELECTRIC DETECTOR
C. Peter Johnson, Jr., Putnam Valley, N.Y.
Filed Sept. 12, 1958, Ser. No. 760,604
11 Claims. (Cl. 88—22.5)

The present invention relates to optical pyrometers and more particularly to a pyrometer of this type provided with photoelectric means for optically comparing the brilliance of a high temperature object with the brilliance of an electrically heated incandescent filament which serves as a temperature reference.

The pyrometer of the present invention is characterized by its simplicity and unusual precision of measurement. At temperatures of the order of 1300° C. it has an accuracy of a few tenths of one degree.

Generally, the pyrometer comprises an objective lens which is directed toward an incandescent heated object having a high temperature which is to be measured.

A real image of the object is produced at a focal plane which passes through the incandescent filament of a calibrated reference temperature lamp. The combined image of the object and the filament is focused by a second optical system at a second focal plane which contains an opaque surface having an observation slit formed therein. A photoelectric tube of the photomultiplier tube is disposed behind the slit. A block of glass is interposed between the second optical system and the slit. By rotating the block of glass, which preferably has two parallel optically finished flat surfaces, the beam of light falling on the slit is shifted laterally by refraction so that the image of the object and the image of the filament may be caused to pass through the slit separately at different times. The photoelectric cell is connected through suitable amplifying means with a chart recorder. If the amplifier output remains constant during rotation of the block of glass, the filament and object are at the same brightness temperature and the chart record is a continuous straight line. If the two brightness temperatures are appreciably different, then a pip appears in the trace made by the pen of the chart recorder, the amplitude of the pip being greater for larger temperature differences.

Various objects, features and advantages of the invention will become apparent upon reading the following specification together with the accompanying drawing forming a part thereof.

Referring to the drawing:

FIGURE 1 is a diagrammatic illustration of an optical pyrometer embodying the invention.

FIGURE 2 is a fragmentary view of a strip chart record illustrating the visual indication produced by the pyrometer.

Referring to FIG. 1 the incandescent object which is the subject of the temperature measurement is indicated at 10. An objective lens or optical system 11 is directed toward the object 10 and produces a real image (not shown) of the object 10 which lies in a first vertical focal plane passing through the line 12. The plane passing through the line 12 also passes through an incandescent filament 13. The filament 13 is disposed within an evacuated glass envelope 14. The envelope 14 comprises optically finished flat glass walls 15 which are inclined with respect to the vertical for diverting reflected light away from the optical axis of the pyrometer.

The filament 13 is energized by a source of electrical energy indicated as a battery 16. The battery 16 is connected to the filament 13 through an adjustable rheostat 17. The filament 13 can be brought with precision to any desired predetermined temperature of incandescence by adjusting the rheostat 17 to provide a corresponding current flow through filament 13, the correct amount of current flow having been previously determined by calibration techniques.

A second lens or optical system 18 is directed toward the filament 13 and produces a real image (not shown) consisting of the filament 13 with the object 10 as a background, this image being produced at a second vertical focal plane passing through the line 19. An opaque screen member 20 lies in this second focal plane and has an observation slit 21 formed therein. The optical axes of the lenses 11 and 18 are in alignment with each other and with the slit 21 and constitute the principal optical axis of the pyrometer. The filament 13 also lies on this principal optical axis.

An interference filter 22 having narrow pass band is disposed on the principal optical axis of the instrument and is interposed between the second lens 18 and the observation slit 21. The characteristics of the filter 22 are such as to exclude light of wave lengths lying outside the range actually used for temperature measurements. The instrument is thus rendered substantially monochromatic in its response characteristics.

Disposed between the filter 22 and the slit 21 is a scanning refractor 24 which is shown as a block of glass of square cross section rotatable about the axis 25 perpendicular to the plane of the drawing and located at the center of the square block. The rotational axis 25 intersects the principal optical axis of the instrument. The glass block 24 has spaced flat parallel optically finished surfaces 27. The finished surfaces 27 are parallel to and equidistant from the rotational axis 25. The other two surfaces 28 need not be finished and may be made opaque, if desired. Alternatively all four faces may be optically finished. Other forms of cross-sectional configuration may be used so long as there are at least two optically finished surfaces between which light may pass and be refracted for lateral displacement which varies in amount by rotation of the glass block.

The glass block 24 is connected by suitable driving means indicated by a dotted line 29 to be rotated on its axis 25 by a motor 30. With the faces 27 exactly vertical, a central ray of light 31 would pass along the principal optical axis of the instrument and enter the slit 21. However, with the faces 27 inclined with respect to the principal axis, as shown, the ray 31, instead of entering the slit 21 is refracted so that it emerges from the glass block 24 displaced from the principal axis as indicated at 31a. Since the central ray 31 is included in the filament image portion of the combined image falling on screen member 20, in the position shown, the object portion of the combined image is entering the observation slit 21. Only while the faces 27 are nearly perpendicular to the principal axis does the filament portion of the combined image enter the slit 21.

Disposed behind the observation slit 21 is a phototube of the photomultiplier type designated as 32. The phototube 32 is so arranged that light passing through the slit 21 falls on the most sensitive portion of the tube, the slit 21 lying on the principal optical axis of the instrument. The phototube 32 is connected to the input of an amplifier 33. The output of amplifier 33 is connected to a strip chart recorder in the form of a zero-center recording millivoltmeter which produces a trace 35 (FIG. 2) on a strip chart 36. The amplifier 33 contains an adjustable balancing circuit of conventional type such that the recorder 34 may be manually adjusted to zero center in response to the brilliance of light reaching the phototube 32 from the object portion of the image focused on the screen 20, or the brilliance of the filament 13, as desired.

In operation, the glass block or prism 24 is rotated by the motor 30, for example, at a speed of ⅟₁₅ revolution per minute and with the strip chart 36 feeding at a linear speed of 6 inches per minute. The rheostat 17 is adjusted to provide a predetermined current flow through the filament 13 such that the brilliance of its incandescence corresponds accurately to the brilliance for the desired temperature of object 10. The temperature of object 10 is thereafter adjusted so that the trace 35 is a smooth unbroken straight line. The temperature of the object 10 is then equal to the predetermined desired temperature.

Alternatively, the amplifier 33 is adjusted so that the trace 35 is centered on the chart 36, as shown. Rheostat 17 is then adjusted so that the pips such as pips 37 are eliminated. The temperature of the filament 13 is then equal to the temperature of the object 10. For temperature differences in the opposite direction, the pips 38 indicated in dotted lines will be produced. When there are no pips the temperatures are equal.

Although the same comparisons may be made by observing an indicating millivoltmeter without any recording chart, it must be watched closely and continuously to detect whether there is any deflection of the needle when the filament portion of the image passes over the observation slit 21. Because the temperature of the object 10, if it is a furnace, changes very slowly, it is desirable to use the strip chart recorder. The scanning speed may be increased, if desired, when an indicating instrument is used. The slow speed described above, however, avoids errors which might be introduced by the inherent inertia and damping of the indicating and/or recording instrument.

It will be apparent to those skilled in the art that various modifications may be made in the specific embodiment of the invention which is herein illustratively shown and described without departing from the spirit and scope of the invention as defined in the appended claims.

What is claimed is:

1. An optical pyrometer comprising objective lens means adapted to be directed toward an incandescent object the temperature of which is to be determined, said objective lens means producing a real image of said object at a first predetermined plane, an incandescent filament disposed at said first plane, means for bringing said filament to a known temperature of incandescence, second lens means producing a combined real image of said object and said filament at a second predetermined plane, an opaque screen member disposed at said second plane, said screen member having an observation slit formed therein, a movable refracting member disposed between said second lens means and said screen member, means for displacing said refracting member to move said combined image with respect to said slit whereby the filament and object portions of said combined image pass through said slit separately and at different times, and photoelectric detecting means disposed behind said slit.

2. An optical pyrometer comprising objective lens means adapted to be directed toward an incandescent object the temperature of which is to be determined, said objective lens means producing a first real image of said object at a first focal plane, second lens means having its optical axis in alignment with the optical axis of said objective lens means, said second lens means producing a real image of said first real image at a second focal plane, an incandescent filament disposed in said first focal plane and on said aligned optical axes whereby an image of said filament is included in the image at said second focal plane, an opaque screen having an observation slit formed therein, said slit being disposed at said second focal plane, a revoluble refracting member consisting of a glass block having at least two optically finished spaced parallel flat surfaces disposed at opposite sides of said block, the rotational axis of said refracting member being parallel to said flat surfaces, said refracting member directing the image of said filament into said slit within a limited range of rotation thereof and onto said screen during a further range of rotation whereby the image of said filament and the image of said object fall on said slit separately for different rotational positions of said refracting member and photoelectric detecting means disposed behind said slit.

3. A pyrometer according to claim 2, further comprising a monochromatic filter means interposed between said objective lens means and said detecting means.

4. A pyrometer according to claim 2, wherein said rotational axis lies midway between said flat surfaces, said pyrometer further comprising drive means for continuously rotating said block.

5. A pyrometer according to claim 4, wherein said glass block is of rectangular cross-section and said flat surfaces are disposed at opposite sides of said rectangle, the rotational axis of said block being disposed at the center of said rectangle.

6. A pyrometer according to claim 2, wherein said detecting means comprises a chart recorder producing a trace having pips therein when the temperatures of said filament and said object are unequal, said trace being a continuous straight line when said temperatures are equal.

7. A pyrometer according to claim 2, wherein said filament is disposed in an evacuated glass envelope having opposite optically finished walls which extend transversely of said aligned optical axes, said walls being inclined to divert reflected light away from said axes.

8. An optical pyrometer having a principal optical axis, said pyrometer comprising objective lens means having an optical axis which coincides with said principal axis, said objective lens means being adapted to be directed toward an incandescent object the temperature of which is to be measured, said objective lens means producing a real image of said object at a first focal plane, an incandescent filament of adjustable temperature disposed on said principal axis at said first focal plane, second lens means having an optical axis which coincides with said principal axis, said second lens means producing a real image at a second focal plane, said image at said second focal plane being a combined image of said object and said filament, an opaque screen member disposed at said second focal plane, said screen member having an observation slit formed therein through which said principal axis passes, a phototube disposed behind said slit, said principal axis passing through a light sensitive portion of said phototube, detector means connected to said phototube for response to changes in illumination falling on said light sensitive portion, a revoluble glass block having at least two spaced parallel optically finished surfaces which are parallel to and equidistant from the rotational axis of said block, said rotational axis intersecting said principal axis, said glass block being disposed between said second lense means and said slit, and means for rotating said glass block to move said combined image with respect to said slit whereby the filament and object portions of said image pass through said slit separately and at different times.

9. A pyrometer according to claim 8, wherein said last-named means comprises continuously operable drive means connected to rotate said glass block whereby said combined image is repeatedly displaced in a cyclical manner.

10. A pyrometer according to claim 8, further comprising monochromatic filter means interposed between said objective lens means and said phototube.

11. An optical pyrometer comprising objective lens means adapted to be directed toward an incandescent object the temperature of which is to be determined, said objective lens means producing a real image of said object at a first predetermined plane, an incandescent filament disposed at said first plane, means for bringing said filament to a known temperature of incandescence, second lens means producing a combined real image of said object and said filament at a second predetermined plane, an opaque screen member disposed at said second plane, said screen member having an observation slit formed therein, a movable refracting member disposed between said first and second planes, means for displacing said refracting member to move said combined image with respect to said slit whereby the filament and object portions of said combined image pass through said slit separately and at different times, and photoelectric detecting means disposed behind said slit.

References Cited in the file of this patent

UNITED STATES PATENTS

| | | |
|---|---|---|
| 1,561,583 | Bash | Nov. 17, 1925 |
| 1,908,977 | Gruss et al. | May 16, 1933 |
| 1,970,103 | Runaldue | Aug. 14, 1934 |
| 2,096,323 | Gille | Oct. 19, 1937 |
| 2,213,904 | Dunn | Sept. 3, 1940 |
| 2,469,115 | Jagersberger | May 3, 1949 |
| 2,572,488 | Jagersberger | Oct. 23, 1951 |
| 2,798,961 | Wormser | July 9, 1957 |
| 2,807,976 | Vossberg | Oct. 1, 1957 |
| 2,898,176 | McNaney | Aug. 4, 1959 |